UNITED STATES PATENT OFFICE.

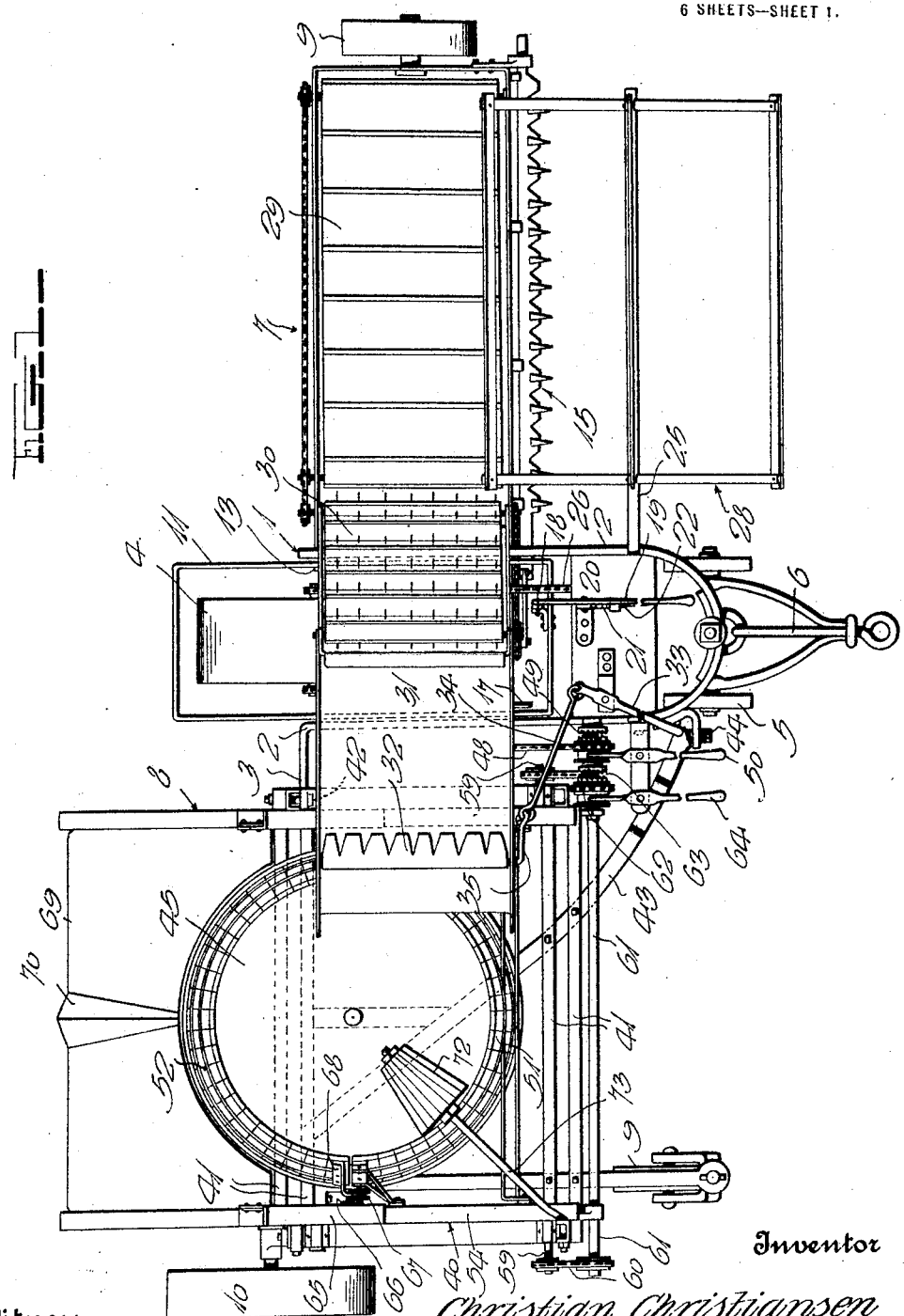

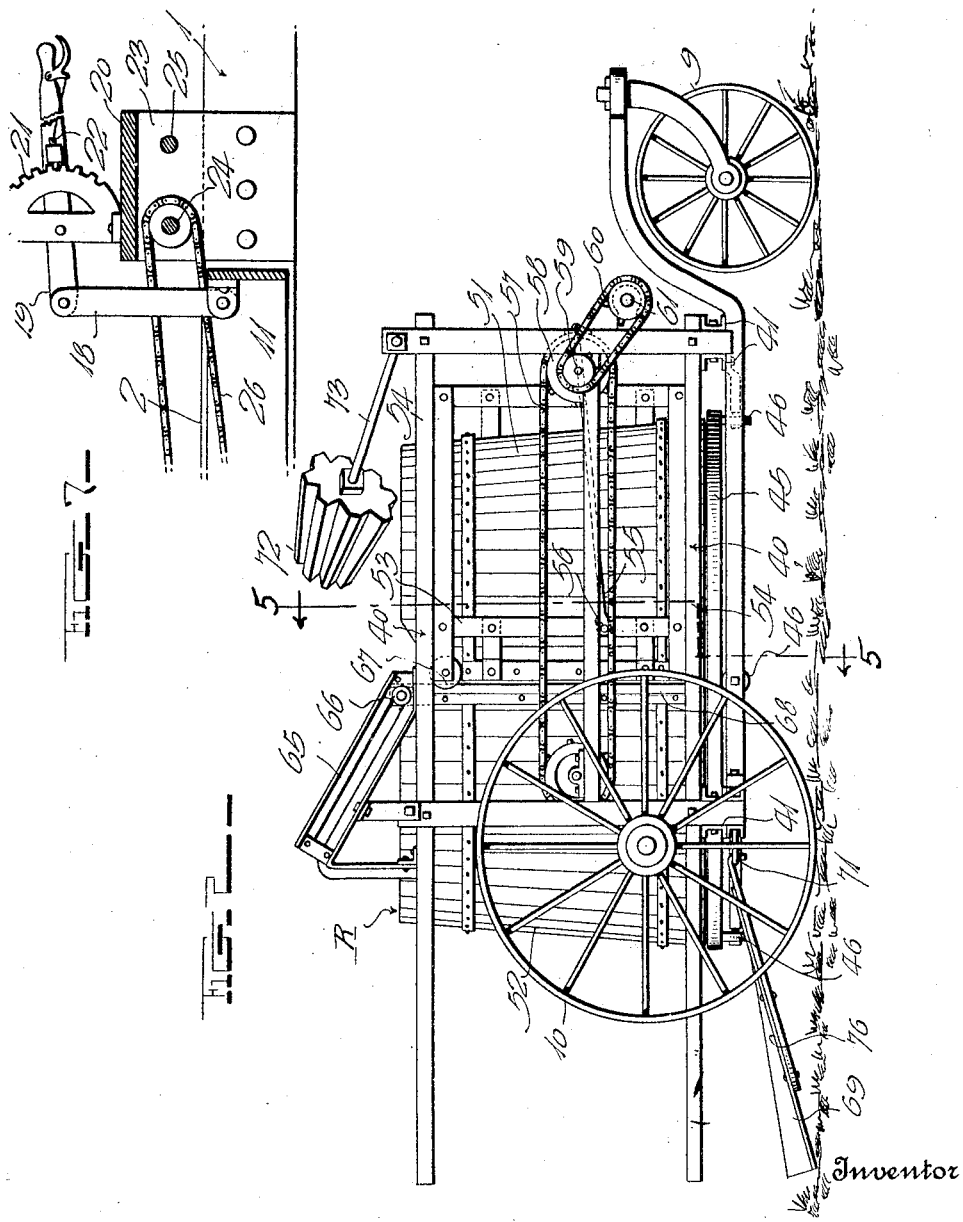

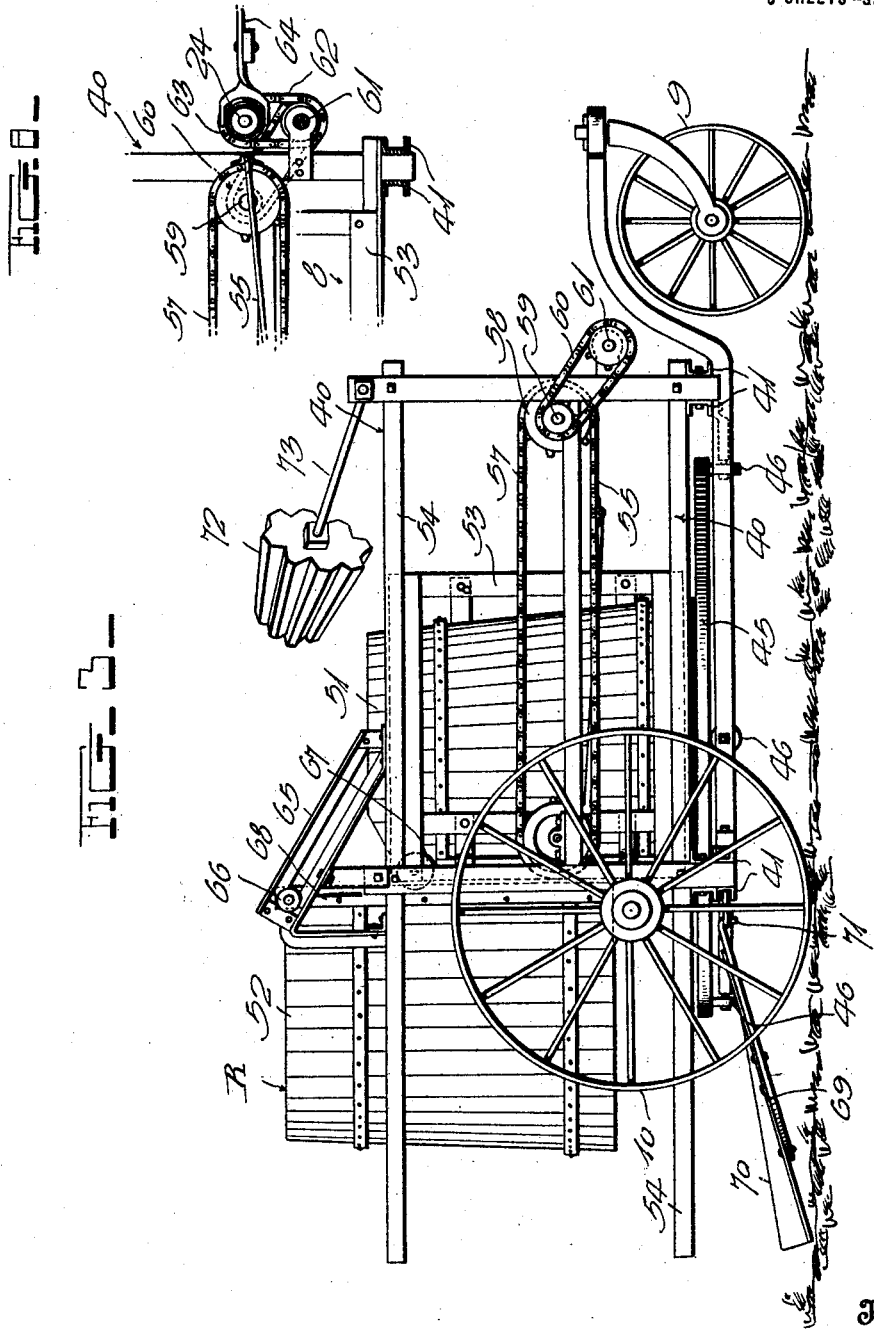

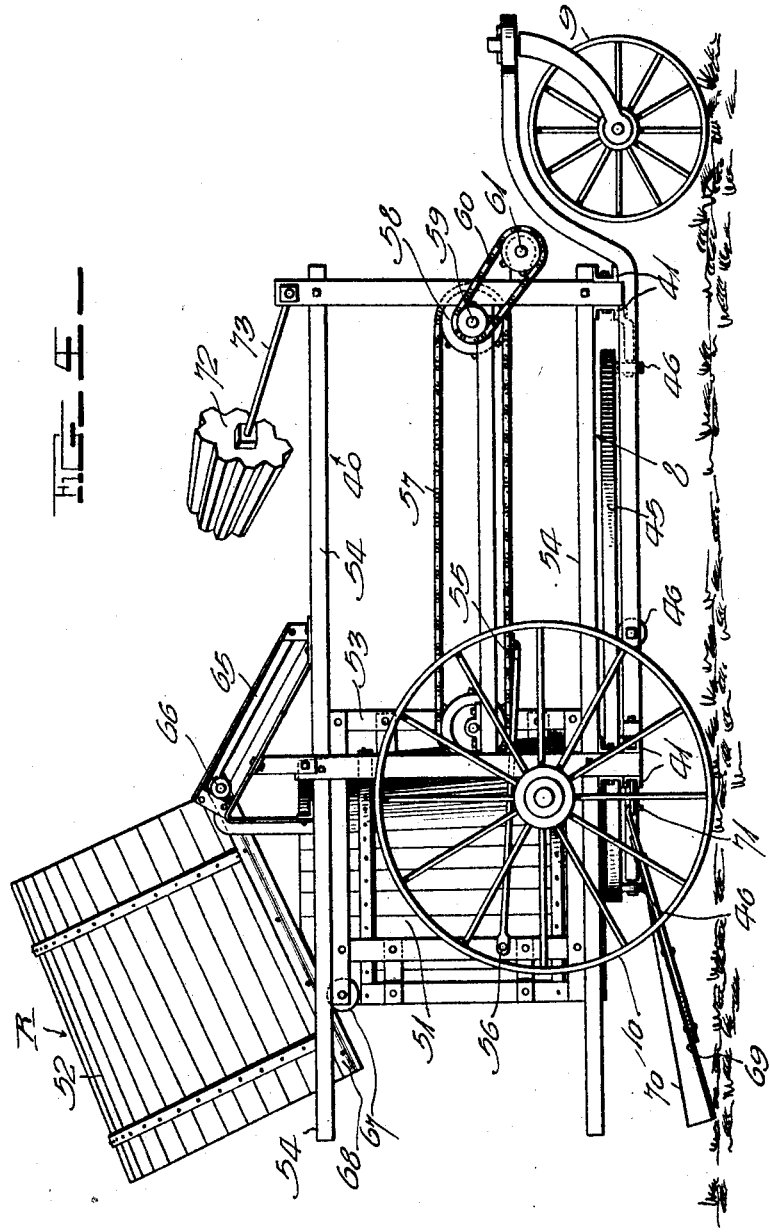

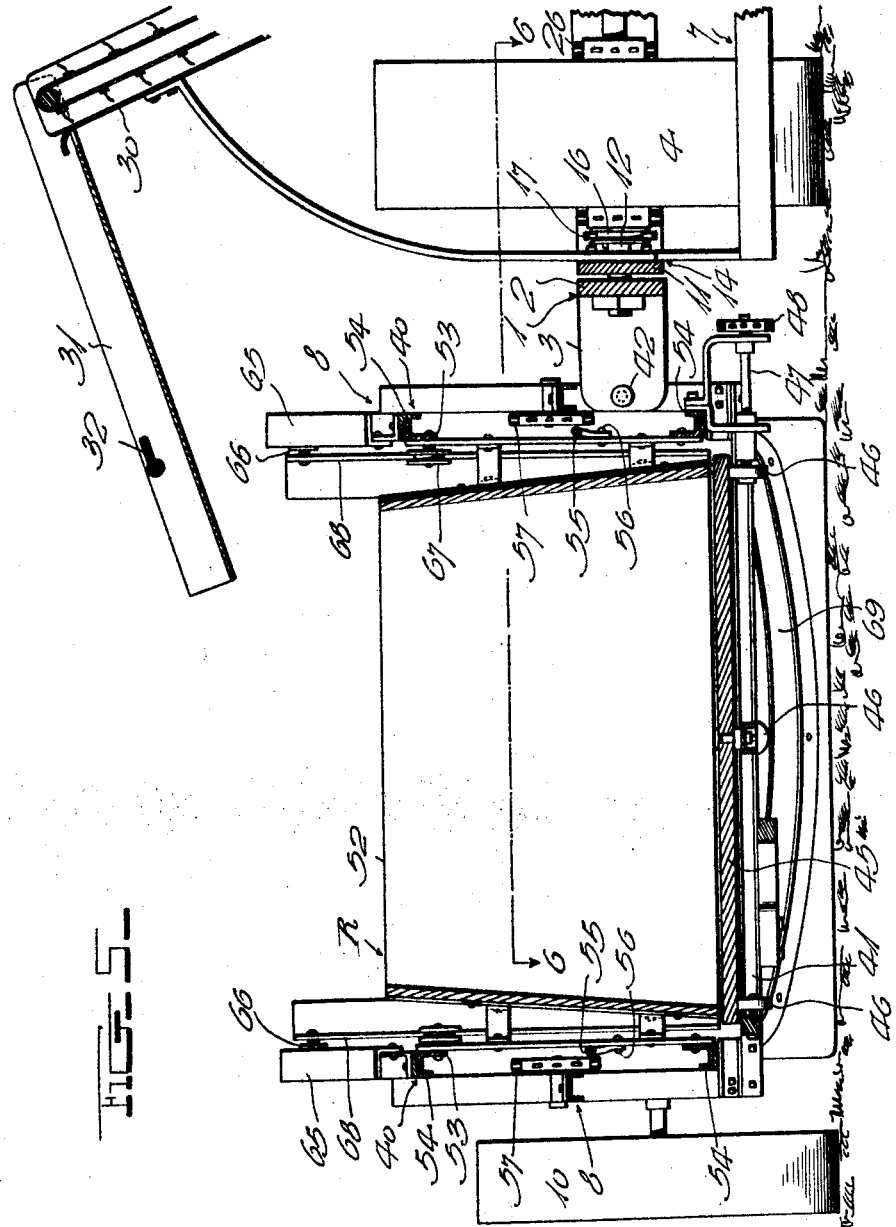

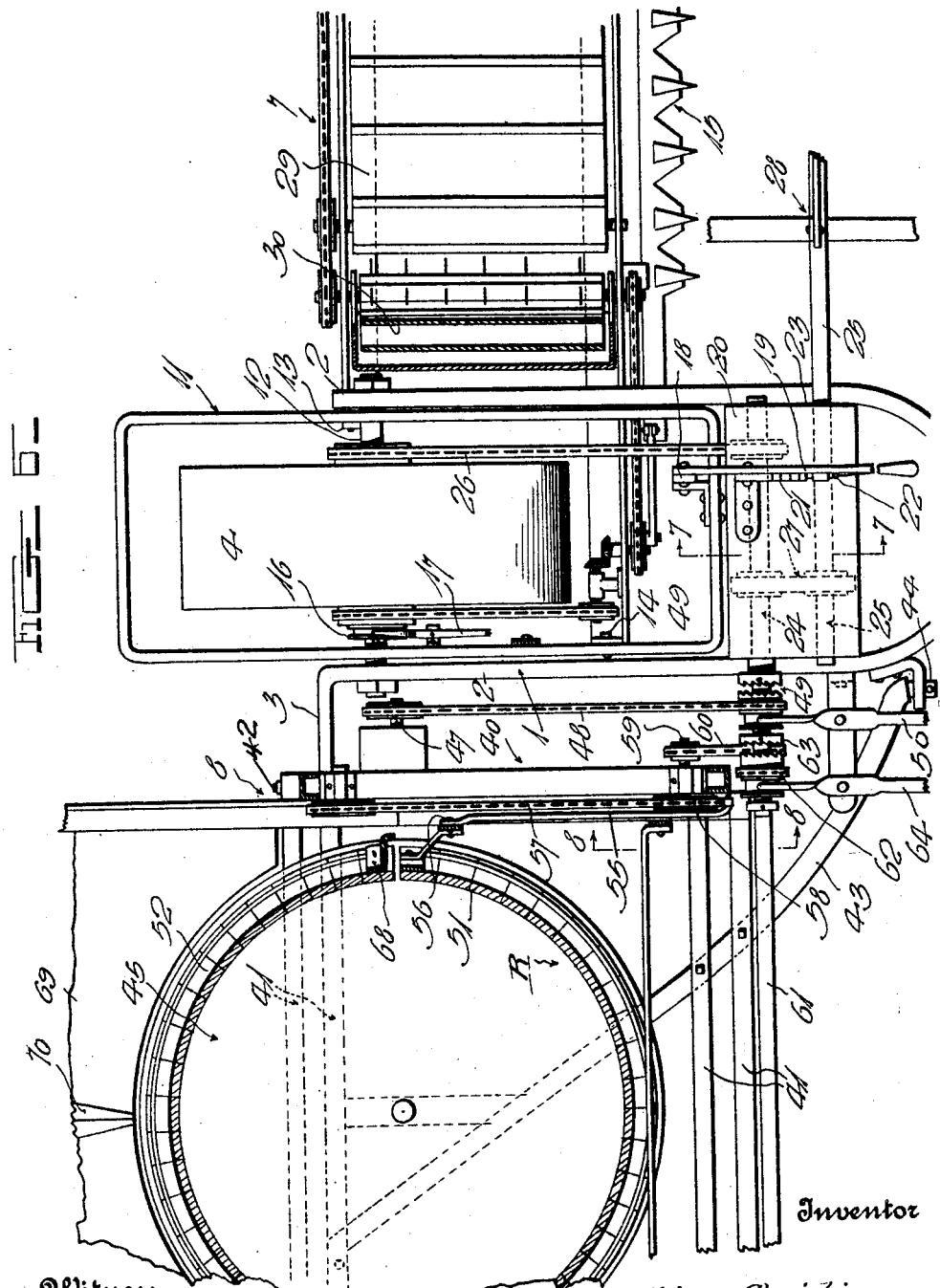

CHRISTIAN CHRISTIANSEN, OF SIOUX FALLS, SOUTH DAKOTA, ASSIGNOR TO THE NEW WAY HARVESTER COMPANY, INC., OF SIOUX FALLS, SOUTH DAKOTA.

SHOCKER.

1,413,966.   Specification of Letters Patent.   Patented Apr. 25, 1922.

Application filed May 6, 1920. Serial No. 379,382.

*To all whom it may concern:*

Be it known that I, CHRISTIAN CHRISTIANSEN, a citizen of the United States, residing at Sioux Falls, in the county of Minnehaha and State of South Dakota, have invented certain new and useful Improvements in Shockers; and I do declare the following to be a full, clear, and exact description of the invention, such as will enable others skilled in the art to which it appertains to make and use the same.

My invention relates to shocking machines of the type in which a receiver for grain, hay or the like is movable rearwardly from a shock-forming platform and opened at its rear side for dumping the shocks as they are completed, such a machine being shown in my U. S. Patent No. 1295271, issued February 25, 1919.

One object of the invention is to provide for delayed opening of the rear side of the receiver instead of starting such opening the moment the receiver starts on its rearward movement, thus allowing the shocks to be lowered onto the ground with less danger of disintegrating them. In carrying out this end, a further aim is to provide for sliding the rear side or section of the receiver upwardly before opening thereof, this also being advantageous in properly discharging the shocks.

Another object is to provide a rearwardly declining platform for easing the shocks from the machine to the ground.

A still further object is to make novel provision for forming an air passage through the lower ends of the shocks as they are discharged, thereby permitting more effective aeration or ventilation of such shocks.

Yet another object is to provide a frame structure which will be well adapted not only for carrying the shocker, but also a cutting mechanism for the grain, hay or other crop to be harvested.

With the foregoing in view, the invention resides in the novel construction and arrangement of parts as hereinafter fully described and claimed, the descriptive matter being supplemented by the accompanying drawings which form a part of this application.

Fig. 1 is a top plan view of a machine constructed in accordance with my invention.

Fig. 2 is a side elevation of the shocking machine showing the receiver in shock-forming position.

Figs. 3 and 4 are views similar to Fig. 2 but illustrating the different positions which the rear section of the receiver occupies as said receiver moves rearwardly to discharge the completed shocks.

Fig. 5 is a vertical transverse section taken substantially on the line 5—5 of Fig. 2.

Fig. 6 is a horizontal section cut substantially on the plane of line 6—6 of Fig. 5.

Figs. 7 and 8 are detail vertical sections as indicated by the lines 7—7 and 8—8 of Fig. 6.

In the accompanying drawings, I have shown a preferred form of the machine, in which the shocking mechanism is embodied in the same machine with a cutting mechanism for hay, grain or the like, but it is to be understood that the shocker may well be constructed as a separate unit or attachment for numerous forms of cutting or harvesting machines should this be desired.

In the construction shown, the numeral 1 designates a main central horizontal frame including a pair of side bars 2 which are preferably formed by bending a single metal bar in the manner shown most clearly in Fig. 1, the rear end of one of the bars 2 being by preference bent laterally as shown at 3 for connection with the frame of the shocking machine yet to be described. The rear portion of frame 1 is provided with a bull wheel 4 while the front end of said frame is supported by a suitable truck 5 having a short tractor hitch 6 for connection to any tractor which may be used for drawing the machine over the ground. In the embodiment illustrated, a cutter carrying frame 7 extends laterally in one direction from the main frame 1, while a frame 8 projects laterally in the opposite direction for carrying the shocking means, the outer ends of said frames 7 and 8 being supported by appropriate wheels 9 and 10. Both the cutting machine and the shocking machine are driven from the bull wheel 4 by means of suitable connections to be described, and all of such connections are under the control of the operator of the tractor pulling the machine, through the instrumentality of a plurality of hand controls which are carried by and extend forwardly from the front end of the frame 1.

In the preferred embodiment of the machine, the bull wheel 4 is mounted within a supplemental horizontal frame 11 which is received between the side bars 2 of the frame 1, the axle 12 or other mounting means of the bull wheel 4 preferably serving as means for pivotally connecting said frame 11 with the frame 1. The cutter carrying frame 7 is secured at its inner end to the supplemental frame 11, for instance at the points designated by the reference numerals 13 and 14. The front part of said frame 7 carries a suitable sickle bar or other appropriate cutter 15 which may be operated by any appropriate connections from the bull wheel 4, one method of operating the cutter being illustrated in Fig. 6. Regardless of the exact operating mechanism used, it is preferably equipped with a suitable clutch 16 under the control of the operator by means of any adequate forwardly extending rod or the like 17.

For raising or lowering the cutter 15 in order that the grain, hay or the like may be severed any required distance above the ground, I provide means for tilting the frame 11, such means being illustrated most clearly in Figs. 6 and 7, in which figures the numeral 18 designates a vertical link pivoted at its lower end to the front end of the frame 11 and connected at its upper end with a lever 19 mounted on the front end of the frame 1 to be controlled at will by the operator of the tractor. The lever 19 is by preference supported on an arched bar 20 whose ends are secured to the side bars 2, and any preferred means such as a sector 21 and a dog 22, may be employed for locking said lever in position to hold the frame 11 at any one of its numerous adjustments.

In the form of construction shown, the vertical ends 23 of the plate 20 serve to rotatably support a pair of horizontal transversely extending shafts 24 and 25, the former being driven from the bull wheel 4 by a suitable sprocket chain or the like 26. Shaft 24 is connected with the operating parts of the shocking machine by means yet to be described and in addition, is connected by a chain or the like 27 with the shaft 25, for driving the latter. The last named shaft carries a suitable reel 28 for feeding the grain or the like to the cutter 15.

As the grain, hay or other crop is cut, it is received on an endless belt conveyer 29 which is mounted on the frame 7, said conveyer delivering to a substantially vertical conveyer 30 which rises to a point above the bull wheel 4, at which point it discharges into a chute 31 which carries the cut material to the receiver of the shocking machine. Chute 31 may well be provided with a suitable gate 32 for checking the discharge of material into the shocking machine while the receiver of the latter is dumping a previously formed shock. I have shown the gate 32 mounted pivotally and operable from a hand-lever 33 on the plate 20, by means of a connecting link 34 pivoted at one end of said lever and connected at its other end with a crank arm 35 with which said gate is provided. The lever 33 and associated parts are illustrated most clearly in Fig. 1 and like the lever 19, said lever 33 extends forwardly within reach of the operator of the tractor.

The frame 8 of the shocking machine may well be of any suitable construction such as that disclosed in my previous patent above referred to, and as shown, said frame includes a pair of vertical longitudinal side frames 40 connected by several transverse bars 41 at their lower ends. The innermost of the frames 40 is pivoted on the longitudinal axis to the lateral end 3 of the frame 1 as indicated at 42, in Figs. 1, 5 and 6. In addition to this pivotal connection, I pivot the front end of a diagonal frame bar 43 to the front end of the frame 1, as illustrated at 44, said bar 43 diverging rearwardly with respect to the frame 1 and being suitably secured to the bars 41. This arrangement not only forms a rigid frame structure for the shocking mechanism, but relative vertical movement of the shocking and cutting machines is permitted to allow free passage thereof over uneven ground.

Rotatably mounted on the horizontal base portion of the frame 8, is a horizontal platform 45 which is supported on a plurality of rollers 46, one of which is carried by a short transverse shaft 47, illustrated most clearly in Figs. 5 and 6, such shaft being driven from the shaft 24 by means of a suitable sprocket chain or like connection 48. A suitable clutch mechanism 49 is provided for controlling movement of the chain 48 and such clutch is under the control of the operator by means of an appropriate lever 50. This construction or one similar thereto, causes rotation of the platform 45 throughout the formation of a shock, although such rotation may be arrested when the shock is to be dumped.

Mounted between the side frames 40 of the frame 8, is a grain receiver R which co-acts with the platform 45 in forming shocks. This receiver includes a front section 51 and a rear section 52, the former being connected with suitable frames 53 mounted for sliding longitudinally along the side frames 40, which frames are shown provided with angle-iron tracks 54 for this purpose. I have shown longitudinal rods 55 pivoted to the frames 53 at the points 56 and connected with sprocket chains 57 which extend along the frames 40, such chains being under control of the operator so that the receiver may be shifted forwardly or rearwardly as required.

Any preferred driving means may be provided for the chains 57, but I prefer that the front sprockets 58 thereof shall be mounted on short transverse shafts 59 in turn driven by sprocket chains or the like 60 from a shaft 61 which extends across the front of the frame 8, said shaft 61 being driven from shaft 24 by a chain 62 and a suitable clutch 63 which may be operated by a hand lever or the like 64. By properly operating this clutch, the entire receiver may be shifted rearwardly for dumping and again pulled forwardly for the formation of another shock.

The rear section 52 of the receiver R abuts the front section 51 and is thus pushed rearwardly therewith, but whereas the corresponding rear section of my patented machine merely swung upward and rearwardly, I prefer to provide means for first causing the section 52 to slide upwardly and for then causing upward and rearward swinging thereof. This means may of course be embodied in numerous forms, but I have shown tracks 65 mounted on the rear corners of the side frames 40 and suitable shoes 66 on the receiver section 52, to travel along said tracks. It thus follows that as the rear section 52 is forced rearwardly by a corresponding movement of the front section 51, said rear section will move from the initial position of Fig. 2, upwardly to the position indicated in Fig. 3, and will then swing upwardly and rearwardly as shown in Fig. 4. I prefer to provide the section 51 with rollers or other shoes 67 which travel along tracks 68 with which the receiver section 52 is provided.

To ease the completed shocks onto the ground as they are shifted from the table 45 I have shown a second platform 69 declining rearwardly from said platform 45. The shocks slide gently down this platform 69 while the receiver section 52 is operating in the manner shown in Figs. 3 and 4 and thus the shocks are carefully deposited onto the ground. I prefer to provide the upper side of the platform 69 with a longitudinal wedge-shaped rib 70 which forms an air passage through the lower end of the completed shocks as they are discharged, but other means might well be provided for carrying out this end. Also, although I have shown the platform 69 detachably hooked to the frame 8, at the point 71, it will be understood that said platform might be otherwise mounted if desired.

In connection with the features above described, I prefer to mount a substantially conical corrugated roller 72 above the normal position of the receiver R, said roller being carried by suitable arm or the like 73 which is secured to one of the side frames 40. This roller is so positioned as to pack the crown of the shocks before they are discharged.

The operation of the machine is as follows:

With all clutches except the one designated by the numeral 63, thrown into operative position, the machine is drawn forwardly by a tractor over the field, with the result that the grain or other crop is cut by the cutter 15 and thrown rearwardly onto the conveyer 29 by the reel 28, the height of cut being regulated by the adjustment of the frame 11, by means of lever 19. The two conveyers 29 and 30 carry the grain inwardly and upwardly and discharge the same into the chute 31, down which it slides onto the platform 45, within the receiver R. This platform is rotating and consequently the grain or the like will be evenly distributed thereover with the heads of the grain at the center of the platform to impart the necessary crown to the completed shock. This crown is effectively packed by the roller 72 when completed. When dumping a completed shock, the gate 32 is closed to momentarily arrest the discharge of grain from the chute 21, the clutch 49 is then thrown out to discontinue rotation of the platform 45, and clutch 63 is thrown in so that the chains 57 are operated to shift the receiver rearwardly over the platform. During the first stage of this rearward shifting, the rear section 52 of the receiver is elevated by means of the tracks 65 and shoe 66, as shown in Fig. 3, while continued rearward movement causes the shoes 67 to force rearwardly on and travel along the tracks 68 so that the rear receiver section 52 is swung upwardly and rearwardly to the position shown in Fig. 4. The shock has now been deposited onto the rearwardly declining platform 69, from which it slides onto the ground, the rib 70 in the meantime forming an air passage through the lower end of such shock to insure effective ventilation thereof. As the chains 57 continue to travel, the front section of the receiver is again brought to its initial position and the rear section 52 follows by gravity. Clutch 63 is then thrown out, clutch 49 is thrown into play to again rotate the platform 45, and the gate 32 is opened to permit further discharge of grain or the like into the receiver.

During passage of the machine over the ground, the pivots 42 and 44 come into play to allow relative movement of the different sections of the frame structure and such movement is permitted by the flexible driving connections employed. The machine is well balanced, may be drawn with practically no side draft due to the central disposition of the frame 1 with its bull wheel 4 in line with the hitch 6 and whenever any of the controls need attention, they may be actuated by the operator of the tractor and it is not necessary that a second operator be provided.

Since good results may be obtained from the details disclosed, they may be followed if desired, but within the scope of the invention as claimed, numerous modifications may well be made.

I claim:

1. A shocker comprising a portable frame having a platform, a receiver movably mounted on said frame over said platform and formed of front and rear sections, means for moving said receiver rearwardly over said platform, and means for effecting rearward swinging of said rear section away from the front section after the two have moved in unison for a predetermined distance.

2. A shocker comprising a portable frame having a platform, a receiver movably mounted on said frame over said platform and formed of front and rear sections, means for moving said receiver rearwardly over said platform, and means for effecting rearward and upward swinging of said rear section away from the front section after the two have moved in unison for a predetermined distance.

3. A shocker comprising a portable frame, a platform mounted on said frame, a receiver over said platform formed of front and rear sections, means for moving said receiver rearwardly over said platform, and means for successively effecting upward shifting and rearward swinging of said rear section during the rearward movement of said receiver.

4. A shocker comprising a portable frame, a platform mounted on said frame, a receiver over said platform formed of front and rear sections, means for moving said receiver rearwardly over said platform, and means for successively effecting upward shifting and upward and rearward swinging of said rear section during the rearward movement of said receiver.

5. A shocker comprising a portable frame having a platform, a receiver movably mounted on said frame over said platform and formed of front and rear sections, means for moving said receiver rearwardly over said platform, fixed trackage on said frame adjacent the upper end of said receiver, shoe means on said rear receiver section movable along said trackage and serving as a pivotal mounting for said rear section when moved rearwardly to a predetermined point, and means for effecting upward and rearward swinging of said rear section when said point has been reached.

6. A shocker comprising a portable frame having a platform, a receiver movably mounted on said frame over said platform and formed of front and rear sections, means for moving said receiver rearwardly over said platform, fixed trackage on said frame adjacent the upper end of said receiver, the rear end of said trackage being at a higher point than the front end thereof, shoe means on said rear receiver section movable rearwardly and upwardly along said trackage to a predetermined point to elevate said rear section as the receiver moves rearwardly, and means for swinging said rear section upwardly around said shoe means after elevation thereof.

7. A shocker comprising a portable frame including vertical longitudinal side frames, a platform between said side frames, a receiver over said platform formed of front and rear sections, means mounting the front section of said receiver for sliding longitudinally between said side frames, means for sliding said front section rearwardly when the receiver is loaded, said front section then acting to push the rear section rearwardly, tracks on said side frames, and shoes on said rear receiver section slidable along said tracks throughout part of the movement of the receiver and then acting as pivots upon which said rear section may swing upwardly and rearwardly.

8. A structure as specified in claim 7, said tracks having their rear ends disposed at a greater height than their front ends to move said rear section of the receiver upwardly as it is moved rearwardly.

9. A shocker comprising a portable frame having a platform, a receiver over said platform, means for moving said receiver rearwardly over said platform and means for opening its rear side to dump a completed shock; together with a second platform declining rearwardly from said first named platform to gradually lower the shock onto the ground.

10. A structure as specified in claim 9, together with means on said second platform for forming an air passage in the lower end of the shock as it slides down such platform.

11. A structure as specified in claim 9, together with a longitudinal rib on said second platform for forming an air passage in the lower end of the shock as it slides down such platform.

12. The combination with a shocker having a rotatable horizontal platform, a wall around said platform and means for discharging grain or other material onto said platform at one side of its center; of a roller at the upper end of said wall having an inclined lower side for packing the crown of the completed shocks, and means mounting said roller for rotary movement.

13. A machine of the class described comprising a main central frame having a bull wheel, a truck supporting the front end of said frame and having a short tractor hitch, a plurality of control members mounted on the front end of said frame and extending forwardly therefrom to be actuated by the operator of the tractor, a crop cutting machine extending laterally in one direction from said main central frame, a shocking machine extending in the opposite direction from said frame for shocking the crop cut by the cutting machine, and driving connections between said bull wheel and said cutting and shocking machines, both of said machines being operatively connected with the aforesaid controls.

14. A machine of the class described comprising a main frame including longitudinal side bars, a supplemental frame between the side bars of said main frame, a bull wheel mounted within said supplemental frame, the mounting of said bull wheel forming a pivot for said supplemental frame, a lateral frame carried by said supplemental frame, and means connecting said main and supplemental frames for tilting the latter to adjust said lateral frame vertically.

In testimony whereof I have hereunto set my hand.

CHRISTIAN CHRISTIANSEN.